United States Patent [19]

Loya

[11] Patent Number: 5,191,945
[45] Date of Patent: Mar. 9, 1993

[54] PLOW DEBRIS DEFLECTOR

[75] Inventor: Noe T. Loya, Raymondville, Tex.

[73] Assignee: L & M Industries, Raymondville, Tex.

[21] Appl. No.: 716,879

[22] Filed: Jun. 18, 1991

[51] Int. Cl.⁵ ............................................. A01B 15/00
[52] U.S. Cl. ..................................... 172/759; 172/734
[58] Field of Search ............... 172/700, 759, 758, 734, 172/163; 411/399, 537, 538, 169, 973, 392

[56] References Cited

U.S. PATENT DOCUMENTS

| | | |
|---|---|---|
| 234,251 | 11/1880 | Currier . |
| 338,481 | 3/1886 | Casaday . |
| 680,846 | 8/1901 | Downen . |
| 961,895 | 6/1910 | Price . |
| 1,686,177 | 10/1928 | Rosekelly ............................. 172/163 |
| 2,672,805 | 3/1954 | Longenbach . |
| 2,712,784 | 7/1955 | Bauer . |
| 2,829,580 | 4/1958 | Bauer ................................... 172/759 |
| 2,907,397 | 10/1959 | Murer ................................... 172/759 |
| 2,915,131 | 12/1959 | Yetter ................................... 172/759 |
| 2,950,771 | 8/1960 | Yetter . |
| 3,036,643 | 5/1962 | Duncanson ......................... 172/759 |
| 3,050,136 | 8/1962 | Rayder . |
| 3,050,137 | 8/1962 | Rayder ................................ 172/759 |
| 3,136,374 | 6/1964 | Laster .................................. 172/759 |
| 3,147,812 | 9/1964 | Duncanson ......................... 172/759 |
| 3,522,851 | 8/1970 | Reddick, Sr. et al. ............. 172/759 |
| 3,736,989 | 6/1973 | Randol et al. . |
| 3,799,274 | 3/1974 | Rower ................................. 172/759 |
| 3,858,664 | 1/1975 | Whalen et al. . |
| 4,318,524 | 3/1982 | Degelman .......................... 172/266 |

FOREIGN PATENT DOCUMENTS 532663 1/1941 United Kingdom ................ 411/538
2159681 12/1985 United Kingdom ................ 172/759

Primary Examiner—Randolph A. Reese
Assistant Examiner—Spencer Warnick
Attorney, Agent, or Firm—Robert J. Koch

[57] ABSTRACT

A plow debris deflector for attachment to plows is disclosed. The plow debris deflector improves trash flow, buries stalks, stems, leaves and other debris without discing and requires low maintenance while providing excellent soil rotation and burying cover crops, trash, litter and other debris eight to ten inches beneath the surface of the soil. The plow debris deflector may include a first vertical portion having a mounting mechanism for mounting the plow debris deflector to a moldboard plow. The mounting mechanism may include a plow connecting slot so the debris deflector may be interchangeably mounted to a variety of plows. A lower portion of the plow debris deflector may be custom designed to complement the shape of the plow to which it is attached. The plow debris deflector includes a second horizontal portion, which may include a curved and twisted plate member for deflecting stalks and stems of various heights. The plate member guides the debris into the previous channel that the plow itself leaves behind while, at the same time, the remaining end of the plow is rotating the second layer of soil on top of the deflected debris, leaving from 90% to 100% of the plow debris eight to ten inches underground. The plate member may be adjustably connected to the vertical portion to permit adjustment in the forward and rearward directions.

20 Claims, 4 Drawing Sheets

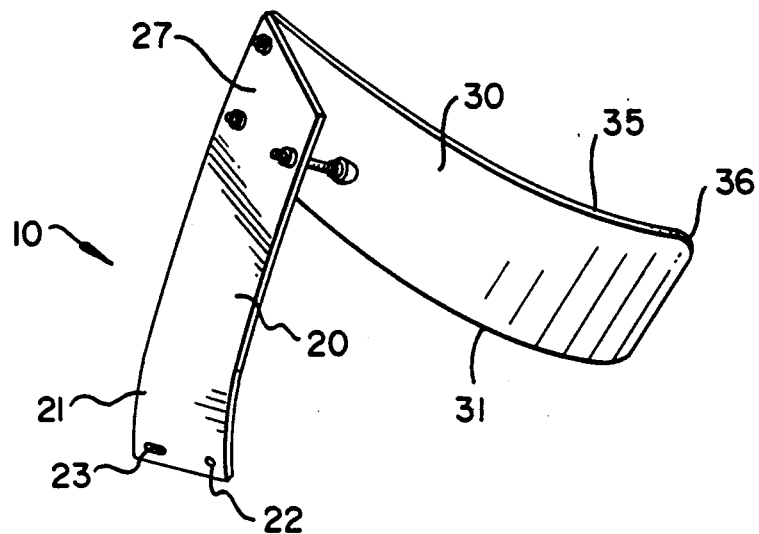
FIG. 1
FIG. 2
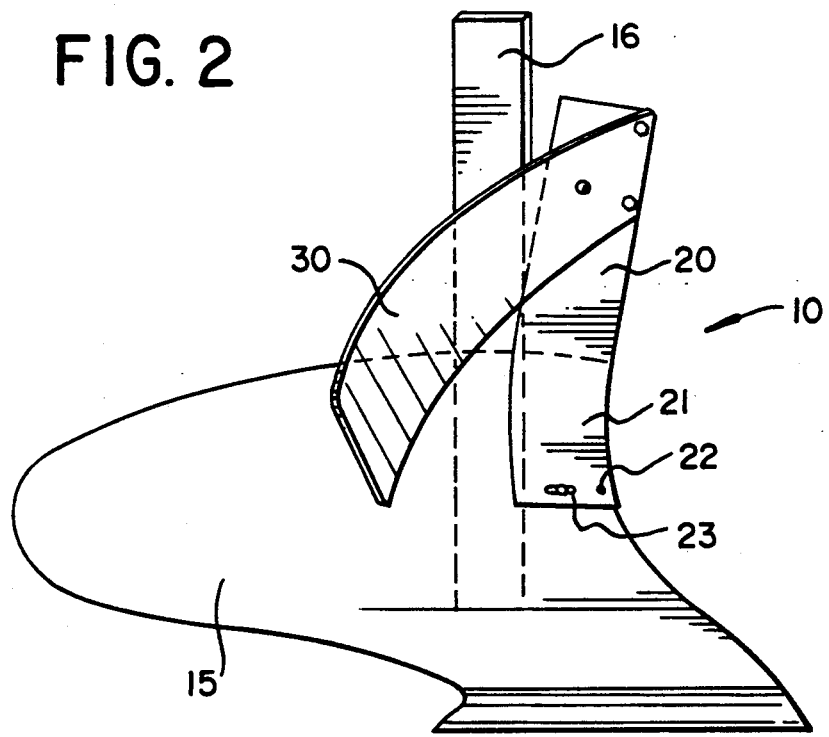

PLOW DEBRIS DEFLECTOR

BACKGROUND OF THE INVENTION

1. Field of the Invention

The invention relates to agricultural implements, and particularly to Plows. More specifically, the invention is based on a plow debris deflector, which may be attached to a moldboard plow to improve the capacity of the plow to bury trash, stems, stalks and other debris.

2. Description of the Related Technology

U.S. Pat. No. 3,036,643 discloses a plow attachment for farm implements. Plow attachment 9 used in conjunction with a plow-share for the purpose of enabling cover crops, trash and litter on a field to be turned underground as the field is plowed. The plow attachment suffers from the drawback of having a bulky adjustable mounting mechanism that contains many parts which may be lost.

U.S. Pat. No. 3,858,664 discloses a universal trash board for moldboard plows. The trash board is made of a high-density plastic material and includes a pattern of interconnecting ribs to strengthen the trash board. A plurality of removable plugs are used to interchangeably mount the trash board on a plurality of moldboard plows.

Known plow debris deflectors have proven to be inadequate for various reasons. A complex mounting mechanism with a plurality of small parts is typically used to mount known plow debris deflectors to moldboard plows. Another drawback of known plow debris deflectors is the limited number of adjustments which can be made to the plow debris deflector. The performance of a plow debris deflector is affected by various factors. The varying conditions of the field, the cover crop grown, the presence of wet or dry clays, sandy soils, and the depth of the field to be plowed may seriously degrade the performance of the plow debris deflector of limited adjustability.

SUMMARY OF THE INVENTION

It is an object of the present invention to provide a plow debris deflector which is easy to use and easy to install. The plow debris deflector according to the invention improves trash flow and requires low maintenance, while providing excellent soil rotation and burying cover crops, trash, litter and other debris eight to ten inches beneath the surface of the soil.

The plow debris deflector according to the invention includes a first vertical portion having a mounting mechanism for mounting the plow debris deflector to a moldboard plow. The mounting mechanism includes a plow connecting slot so the debris deflector may be mounted to a variety of plows. A lower portion of the plow debris deflector may be custom designed to complement the shape of the plow to which it is attached by providing a snug fit between the deflector and the plow. The plow debris deflector includes a second horizontal portion, which may be a slightly paraboloid plate member, which deflects stalks and stems of various heights. The plate member guides the debris into the previous channel that the plow itself leaves behind while, at the same time, the remaining end of the plow is rotating the second layer of soil on top of the deflected debris, leaving from 90% to 100% of the plow debris eight to ten inches underground. The plate member may be adjustably connected to the vertical portion to permit adjustment in the forward and rearward directions.

BRIEF DESCRIPTION OF THE DRAWINGS

FIG. 1 shows a perspective view of a plow debris deflector according to the invention;

FIG. 2 shows a perspective view of the invention mounted on a moldboard plow;

DESCRIPTION OF THE PREFERRED EMBODIMENT

Figure 3:
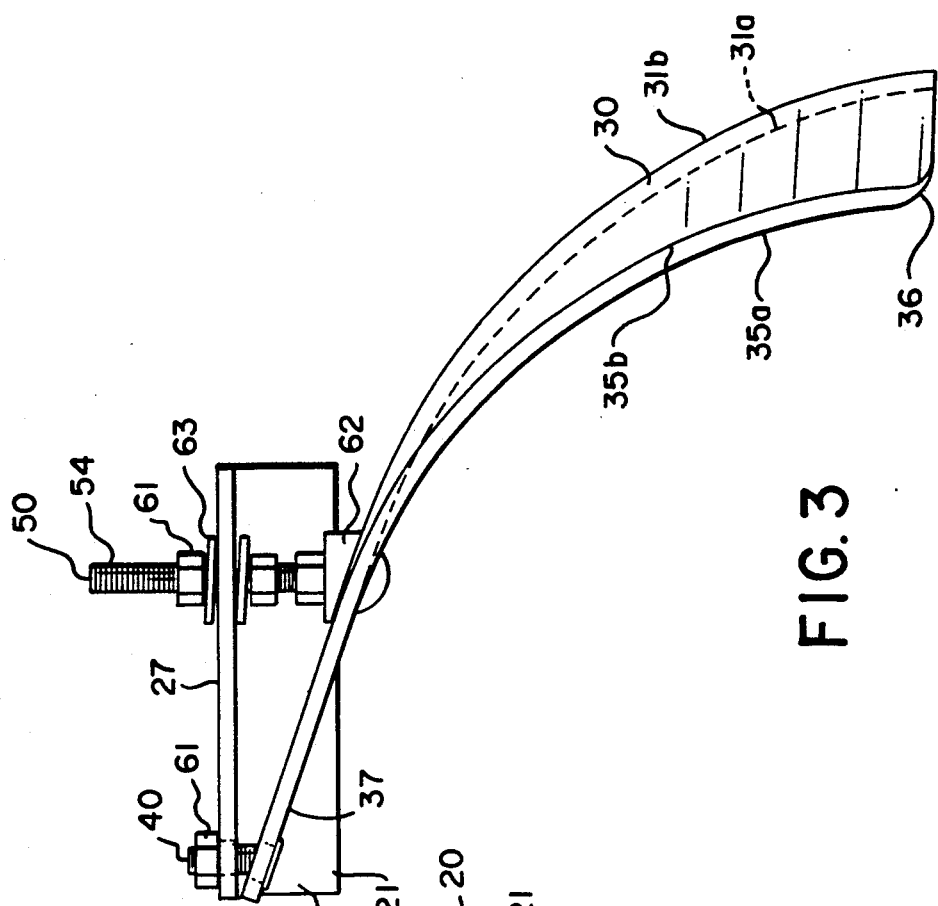
FIG. 3 shows a top plan view of a left-side plow debris deflector.

A plow debris deflector 10 in accordance with the invention is shown in FIGS. 1 and 2. The plow debris deflector includes a first vertical portion 20 and a second horizontal portion 30. First vertical portion 20 includes a lower portion 21, a through bore 22, a plow connecting slot 23, and an upper portion 27. Second horizontal portion 30 includes a lower surface 31, an upper surface 35, and a rounded corner 36. The plow debris deflector is releasably connected to a plow 15 by through bore 22 and plow connecting slot 23. The plow includes a shank portion 16.

Figure 7:
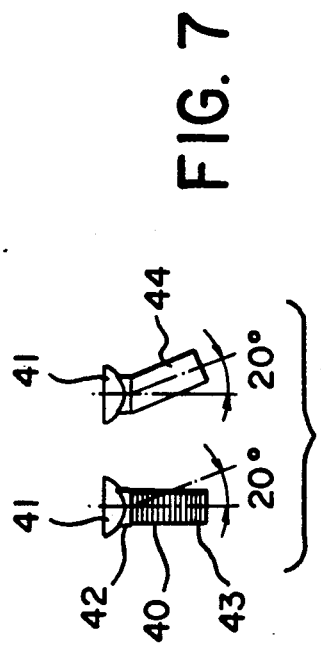
FIG. 7 shows a connecting bolt before and after bending which is used with the plow debris deflector.

FIG. 3 shows a first embodiment of the invention. The plow debris deflector is configured as a left side plow debris deflector. First vertical portion 20 is adjustably connected to second horizontal portion 30. As best seen in FIG. 7, a plurality of connecting bolts 40 are used to connect first vertical portion 20 to second horizontal portion 30. Connecting bolt 40 includes a round head 41, a square bottom 42, and a threaded portion.

Figure 4:
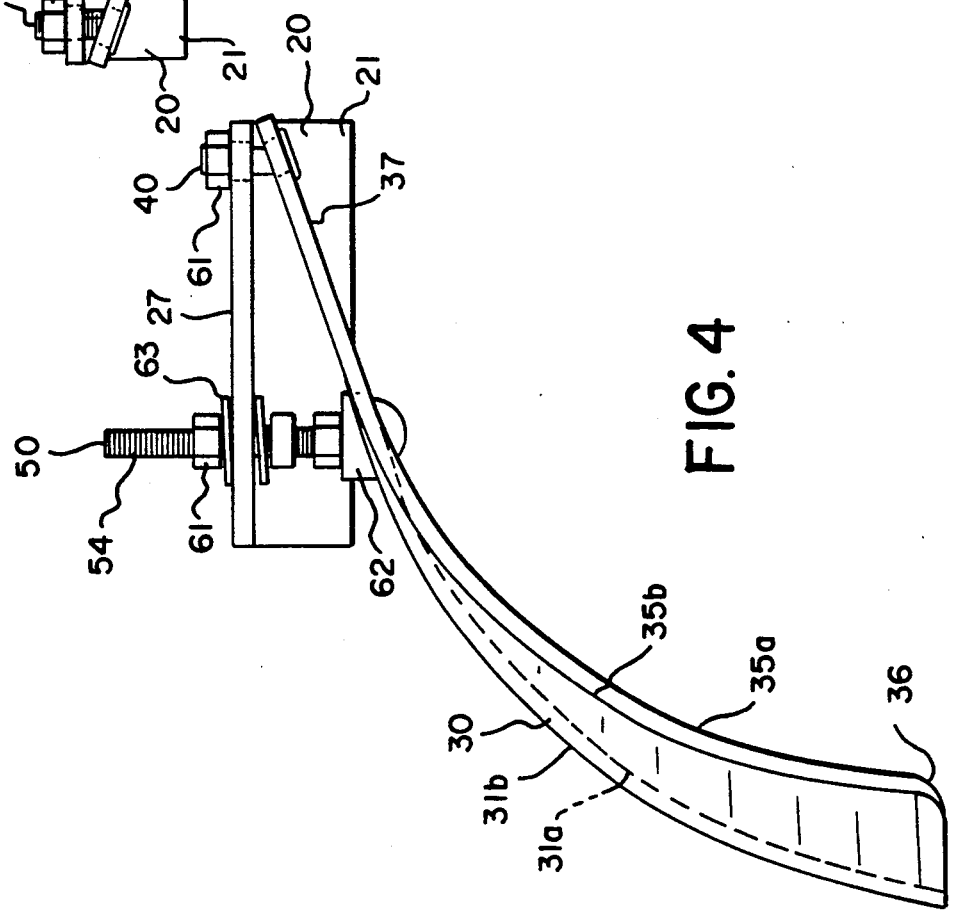
FIG. 4 shows a top plan view of a right-side plow debris deflector.
Figure 8:
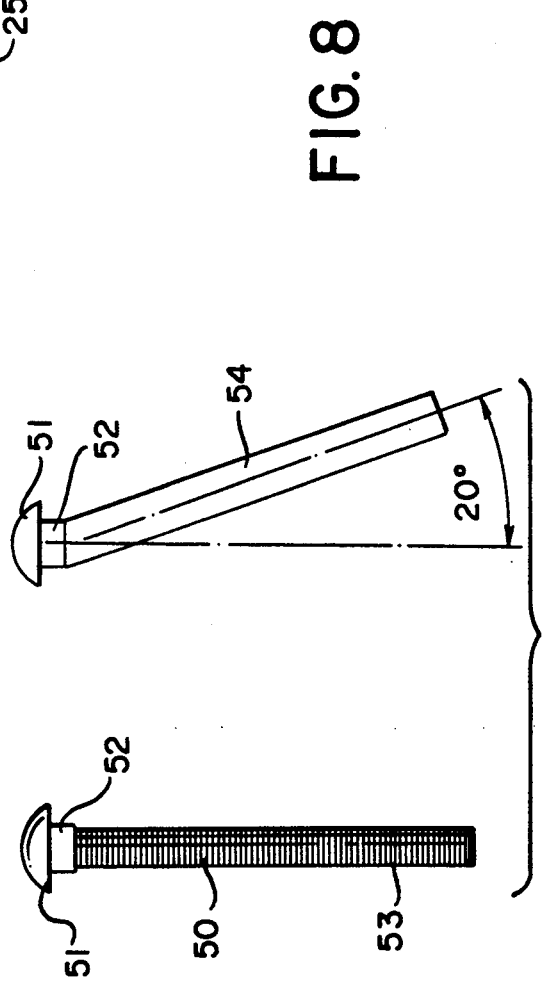
FIG. 8 shows an angle adjusting bolt before and after bending which is typically used with the plow debris deflector.

To facilitate the adjustable connection, the connecting bolt may be bent. As best seen in FIGS. 3 and 4, in the preferred embodiment of the invention, second horizontal portion 30 is mounted in angled relation to first vertical portion 20. Further, the adjustable connection between portions 20, 30 may be varied in the rearward and forward directions, thereby varying the angular relationship between portions 20, 30. To minimize the stress on bolts 40, 50, which form the angled connection between portions 20, 30, it is preferable to bend bolts 40, 50 at an angle. Regarding the angled connection, an angled bolt is subjected to less stress than a straight bolt. The increased stress on a straight bolt could lead to bolt failure, which is undesirable. The connecting bolt may be bent at a 10° to 40° range and preferably a 20° angle from the center line. The threaded portion of the connecting bolt before bending is depicted as 43. The threaded portion of the connecting bolt after bending is depicted as 44. An adjusting bolt 50 adjustably connects first vertical portion 20 to second horizontal portion 30. As best seen in FIG. 8, adjusting bolt 50 includes a round head 51, a square bottom 52, and a threaded portion. Before bending, the threaded portion of the adjusting bolt is depicted as 53 and after bending the threaded portion is depicted as 54. As similarly described above with respect to connecting bolt 40, the adjusting bolt may also be bent through a variety of angles preferably the bending angle is 20°.

As seen in FIGS. 3 and 4, the upper surface of second horizontal portion 30 includes an inner edge 35a and an outer edge 35b. Similarly, the lower surface of second horizontal portion 30 includes inner edge 31a and outer edge 31b. Second horizontal portion 30 also includes a substantially flat portion 37. First vertical portion 20 also includes upper portion 27, which is substantially flat according to the preferred embodiment. A plurality of standard nuts 61 are used with connecting bolts 40 and adjusting bolt 50 to form a plurality of releasable connections. The releasable connection that includes adjusting bolt 50 should also include a wedge washer 62 and a plurality of standard washers 63. The preferred embodiment of the invention includes wedge washer 62. Although wedge washer 62 is not essential to the invention, the wedge washer further relieves stress on adjusting bolt 50 which is caused by the angled connection between portions 20, 30. Failure to use wedge washer 62 may lead to premature bolt failure, thus degrading the performance of the plow debris deflector. FIG. 4 shows another embodiment of the invention, which is configured as a right side plow debris deflector. The element numbers for FIG. 4 are repeated from like parts of FIG. 3. For purposes of clarity only, through bore 22 and adjustment slot 23, which are shown in FIGS. 1, 2 and 5, have been omitted from FIGS. 3 and 4.

Figure 5:
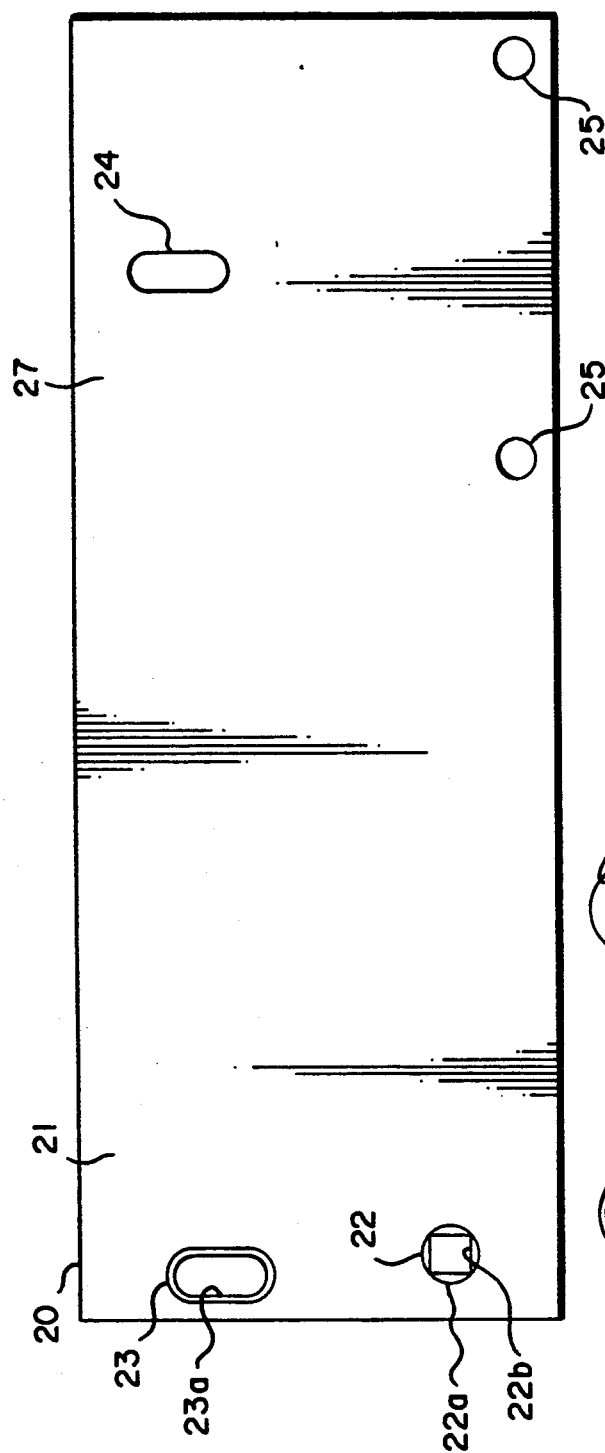
FIG. 5 shows a side elevation of a first vertical portion of a plow debris deflector according to the invention.

FIG. 5 shows an elevational view of first vertical portion 20 prior to bending. The first vertical portion includes a lower portion or lower area 21, a through bore 22 having a circular beveled cross-section 22a and a square cross-section 22b, and an adjustment slot 23 having a beveled portion 23a. First vertical portion 20 also includes an adjustment slot 24 and a plurality of through bores 25 which may be located on substantially flat portion 27.

A further feature of first vertical portion 20 is to curve lower area 21. According to the preferred embodiment, vertical portion 20 is 6"×16" in dimensions and has a 1'-8½" radius along part of its length beginning at lower portion 21 and ending 8⅜" from the end proximal to substantially flat portion 27 of vertical portion 20. In other words, vertical portion 20 includes, along the surface facing a plow moldboard, a 1'-8¾" radius beginning at the end proximal to lower portion 21 and ending 8⅜" from the end proximal to substantially flat portion 27 of vertical portion 20. The larger radius, i.e., the 1'-8¾" radius, is due to the preferably ¼" thickness of the plate.

Figure 6:
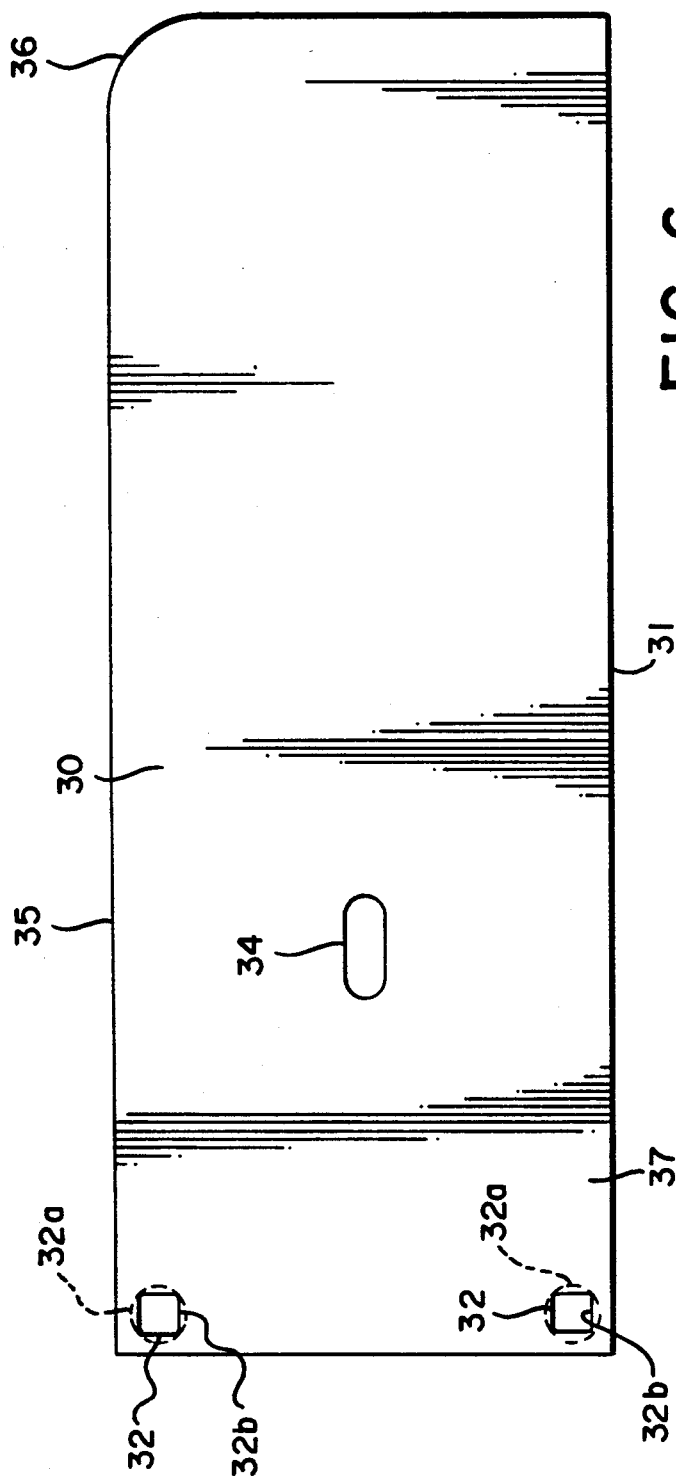
FIG. 6 shows a side elevation of a second horizontal portion of a plow debris deflector according to the invention.

FIG. 6 an elevational view of second horizontal portion 30 prior to bending. The second horizontal portion includes a lower surface 31, a plurality of through bores 32, an adjustment slot 34, and a rounded corner 36. Preferably, through bore 32 includes a circular beveled cross-section 32a and a square cross-section 32b located on substantially flat portion 37. The substantially flat portion of edge 35a defines a longitudinal axis or direction of second horizontal portion 30. Edge 35a also defines the length of second horizontal portion 30. A lateral axis or direction is defined by the line passing through the centers of through bores 32. The surface of second horizontal portion 30 that is substantially perpendicular to upper surface 35 and parallel to the lateral axis defines the width of second horizontal portion 30.

The invention is custom designed to assist a deep plow to plow and rotate the standing harvested crops from 90 to 100% without discing or shredding. Although similar devices have been tried before, the invention has more options for adjustment depending on the conditions of the field. When adjusted correctly, the invention produces excellent results in debris and soil rotation. The invention has been tested on standing cotton, soy beans, sorghum and corn stalks, as well as cover crops, wet and dry clays, and sandy soils with excellent results.

In operation, through bore 22 on first vertical portion 20 is matched with an existing hole on the plow. preferably, a grade 5 7/16"×1¾" carriage bolt is used for a secure connection. Plow connecting slot 23 is preferably an elongated slot having a substantially rectangular configuration which allows a fit for most brands of plows. Preferably the slot is ½"×1¼" to accept a grade 5 7/16"×1¾" carriage bolt. Preferably, lower portion 21 is custom designed to complement the shape of the moldboard of plow 15 so a snug fit results. The snug fit with the plow allows for equal results in soil rotation. Preferably, first vertical portion 20 is approximately 16 inches in height and approximately 6 inches in width. The height above the plow allows the plow debris deflector to keep stalks, stems and other debris from balling up at shank 16 of the plow. A further advantage of the height allows the user to plow at any desired depth and have excellent soil rotation. Further, the vertical clearance defined between lower surface 31 of the second horizontal portion and an upper surface of plow 15 allows improved trash or debris flow. First vertical portion 20 also includes through bores 25 and adjustment slot 24. First vertical portion 20 is custom designed and fitted to allow adjustment of the second horizontal portion 30 for improvement of trash flow.

Regarding second horizontal portion 30, square cross-section 32b is preferably a ½" square hole which is fitted with 2 custom designed grade 2 7/16"×1" carriage bolts with a 20° angle for secure attachment of first vertical portion 20 to second horizontal portion 30. The second horizontal portion is preferably a rectangular configuration made of standard grade steel approximately ¼ inch thick. Adjustment slot 24 of the first vertical portion, adjustment slot 34 of the second horizontal portion, and adjusting bolt 50 cooperate to provide an adjustable connection. Preferably a grade 2 carriage bolt 7/16"×4" with a 20° angle holds the portions 20, 30 together with preferably 7/16" nuts and a ¼" beveled wedge for secure attachment. These sizes permit a 3" inward and outward adjustment of the portions. The adjustment may be necessary depending on various factors such as the type of soil, the height of the stalks and stems and the working depth of the deep plow.

Second horizontal portion 30 is preferably a 6"×16" blade which is custom curved to exhibit a curved dimension with a twist. Second horizontal portion 30 curves in the longitudinal direction of the blade and twists in the lateral direction of the blade. The curving and twisting nature of the second horizontal portion is an important feature of the invention. The horizontal portion according to the invention deflects debris and produces smooth debris and soil flow at the proper angle to be driven downward and covered by a following cleaner layer of soil. According to the invention, bolts 40, 50 may be adjusted to accommodate for the height of the debris, working depth of the plow, differences in soil type, and the varying moistness or dryness of the soil.

As best seen in FIGS. 3 and 4, debris hitting the deflector in the area of bolts 40, 50 passes along the curved and twisted portion of horizontal portion 30 before exiting the deflector in the vicinity of rounded corner 36. Horizontal portion 30 of the preferred embodiment also utilizes a 6"×16" rectangular plate. Preferably, the horizontal portion is curved and twisted so inner edge 35a of the upper surface has an 8"-21/32" radius that begins 4⅞" from the end of portion 30 proximal to substantially flat portion 37. Further, the curved and twisted part of second horizontal portion 30 preferably has a 9 23/32" radius along inner edge 31a of the lower surface that begins 5⅞" from the end of portion 30 proximal to substantially flat portion 37. This curvature of two edges of the horizontal portion 30 at different radii causes a curvature of the plate along its longitudinal axis and a twisting effect along its lateral axis.

Second horizontal portion 30 stalks and stems up to 30 inches in height. The special curved and twisted portion guides the debris in the previous channel that the plow itself leaves behind. At the same time, the remaining end of the plow is rotating the second layer of soil on top of the deflected debris, leaving 90-100% of the debris 8 to 10 inches underground.

Use of the invention results in saved trips to the fields for shredding and discing debris, its placement of 90-100% of organic matter underground saves wear and tear on expensive farm equipment. By putting debris 8 to 10 inches underground there will be less regrowth in later months which means less cultivation time will be required for the intended crops. A further advantage of placing the debris underground saves on fertilizer costs because of the debris will decompose and return nutrients to the soil. An additional result of the debris decomposing and not regrowing is a savings in herbicide costs because there is less chance of new growth.

The illustrative embodiments are shown by way of example. The spirit and scope of invention is not to be restricted by the preferred embodiments shown.

I claim:

1. A plow debris deflector comprising:
    a first portion configured to connect a plow moldboard;
    a second portion exhibiting a lower surface; and
    an adjustable connector adjustably connecting said first portion to said second portion and comprising at least an adjusting bolt exhibiting a longitudinal axis and an angled portion positioned at a range of approximately 10° to 40° from the longitudinal axis and configured to adjust an angular connection between said first and second portions.

2. A plow debris deflector according to claim 1, further comprising:
    a plow mounting mechanism located on said first portion, said plow mounting mechanism and said first portion are configured to mount said plow debris deflector on a plow in flush alignment along on edge of the plow and said deflector.

3. A plow debris deflector according to claim 2, wherein said plow mounting mechanism exhibits a slot.

4. A plow debris deflector according to claim 1, wherein said first portion exhibits a lower area configured to complement the shape of the plow moldboard.

5. A plow debris deflector according to claim 1, wherein said adjustable connector comprises:
    a slot located on said first portion; and
    a corresponding slot located on said second portion.

6. A plow debris deflector according to claim 1 further comprising a connecting bolt connecting said first and second portions.

7. A plow debris deflector according to claim 6, wherein said connecting bolt includes a longitudinal axis and exhibits an angled portion positioned at a range of approximately 10° to 40° from the longitudinal axis.

8. A plow debris deflector according to claim 7, wherein said angled portion of said connecting bolt is positioned at approximately 20° from the longitudinal axis.

9. A plow debris deflector according to claim 1, wherein said angled portion of said adjusting bolt is positioned at approximately 20° from the longitudinal axis.

10. A plow debris deflector according to claim 1, wherein:
    said second portion exhibits a free end including an upper edge having a first radius and a lower edge having a second radius different from said first radius.

11. A plow debris deflector according to claim 10, wherein said second radius is larger than said first radius.

12. A plow debris deflector according to claim 1, wherein said first and second portions are further configured to define a vertical clearance between said second portion lower surface and an upper surface of the plow moldboard.

13. A plow debris deflector according to claim 12, wherein said second portion exhibits a width, and
    said vertical clearance exceeds said second portion's width.

14. A plow debris deflector according to claim 1, wherein said adjustable connector is configured to define an adjustable connection between said first and second portions, said first and second portions are configured to define an angular gap at the adjustable connection between said first portion and said second portion, said adjustable connector is further configured to increase or decrease the angular gap between said first and second portions.

15. A plow debris deflector comprising:
    a first portion connected to a plow and moldboard and exhibiting a substantially flat surface and a curved surface;
    a second portion exhibiting a substantially flat surface and a curved and twisted surface, said curved and twisted surface including a free end having an upper edge with a first radius of approximately 8 21/32" and a lower edge with a second radius different from said first radius; and
    an adjustable connector adjustably connecting said first portion to said second portion, said adjustable connector is configured to define an adjustable connection with an angular gap between said first and second portions, said adjustable connector is further configured to increase or decrease the angular gap between said first and second portions.

16. A plow debris deflector according to claim 15, wherein said second radius is larger than said first radius.

17. A plow debris deflector according to claim 15, wherein said second portion further exhibits a lower surface, said first and second portions are configured to define a vertical clearance between said second portion lower surface and an upper surface of the plow moldboard.

18. A plow debris deflector according to claim 15, wherein a first edge of said first portion exhibits a radius of approximately 1″–8½″.

19. A plow debris deflector according to claim 15, wherein a second edge of said first portion exhibits a radius of approximately 1″–8¾″.

20. A plow debris deflector according to claim 15, wherein a lower edge of said second portion exhibits a radius of approximately 9 23/32″.

* * * * *